United States Patent
Chen et al.

(10) Patent No.: US 12,399,824 B2
(45) Date of Patent: Aug. 26, 2025

(54) MEMORY MANAGEMENT METHOD AND APPARATUS

(71) Applicant: Huawei Technologies Co., Ltd., Guangdong (CN)

(72) Inventors: Xiao Chen, Shenzhen (CN); Kaiyao Huang, Dongguan (CN); Long Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/192,175

(22) Filed: Mar. 29, 2023

(65) Prior Publication Data

US 2023/0236971 A1 Jul. 27, 2023

Related U.S. Application Data

(63) Continuation of application No. PCT/CN2021/120865, filed on Sep. 27, 2021.

(30) Foreign Application Priority Data

Sep. 30, 2020 (CN) .......................... 202011066092.5

(51) Int. Cl.
*G06F 12/0802* (2016.01)

(52) U.S. Cl.
CPC ................................. *G06F 12/0802* (2013.01)

(58) Field of Classification Search
CPC ...... G05B 13/00–048; G05B 15/00–02; G05B 17/00–02; G06F 1/00–3296;

(Continued)

(56) References Cited

U.S. PATENT DOCUMENTS 6,912,612 B2 * 6/2005 Kapur .................. G06F 12/082
711/138
8,103,834 B2 * 1/2012 Cypher ............... G06F 12/0817
711/146

(Continued)

FOREIGN PATENT DOCUMENTS

| CN | 108762687 A | 11/2018 |
|---|---|---|
| CN | 108920269 A | 11/2018 |

OTHER PUBLICATIONS

Machine translation of "Cgroup limits CPU, IO, memory and scheduling policies in Linux systems"; Xiaomin0322; Jul. 2, 2019; retrieved from https://web.archive.org/web/20200925073235/https://my.oschina.net/XIAOMINMIN/BLOG/3068364 on May 20, 2024 (Year: 2019).*

(Continued)

*Primary Examiner* — Daniel C. Chappell
(74) *Attorney, Agent, or Firm* — WOMBLE BOND DICKINSON (US) LLP

(57) ABSTRACT

This disclosure provides a memory management method and apparatus, to perform refined management on a process access status in a physical host, a virtual machine, or a container, and a traffic occupation status of each control group (cgroup). The method can includes a first record table corresponding to a target cache page is used to record all cgroups that have read or written target data from or into the target cache page and a quantity of times that the target data is read or written by all the cgroups, to improve accuracy of a traffic statistics result of a cgroup. In this case, throttling is performed on a first cgroup based on an updated first record table, so that throttling on the first cgroup can be more fair and accurate.

17 Claims, 5 Drawing Sheets

(58) Field of Classification Search
CPC ............... G06F 3/00; G06F 3/06–0689; G06F
5/00–16; G06F 8/00–78; G06F 9/00–548;
G06F 11/00–3696; G06F 12/00–16; G06F
13/00–4295; G06F 15/00–825; G06F
16/00–986; G06F 18/00–41; G06F
17/00–40; G06F 21/00–88; G06F
2009/3883; G06F 2009/45562–45595;
G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| 9,654,483 | B1* | 5/2017 | Benson | H04L 63/1466 |
| 10,095,624 | B1* | 10/2018 | Visvanathan | G06F 12/0862 |
| 10,496,290 | B1* | 12/2019 | Visvanathan | G06F 3/0652 |
| 2004/0123084 | A1* | 6/2004 | DeWitt, Jr. | G06F 11/3636 |
| | | | | 714/E11.207 |
| 2008/0270692 | A1* | 10/2008 | Cochran | G06F 12/0888 |
| | | | | 711/114 |
| 2012/0210066 | A1* | 8/2012 | Joshi | G06F 12/0888 |
| | | | | 711/E12.017 |
| 2012/0297127 | A1* | 11/2012 | Belluomini | G06F 12/0866 |
| | | | | 711/E12.008 |
| 2014/0149638 | A1* | 5/2014 | Jain | G06F 12/0888 |
| | | | | 711/103 |
| 2014/0173312 | A1* | 6/2014 | Shippy | G06F 9/5094 |
| | | | | 713/323 |
| 2014/0223106 | A1* | 8/2014 | Shivashankaraiah | |
| | | | | G06F 12/122 |
| | | | | 711/136 |
| 2017/0085442 | A1* | 3/2017 | Dinan | H04L 47/10 |
| 2017/0220592 | A1* | 8/2017 | Foltz | G06F 12/0806 |
| 2018/0041477 | A1* | 2/2018 | Shaposhnik | G06F 21/53 |
| 2019/0033933 | A1* | 1/2019 | Hur | G06F 12/0868 |
| 2019/0057035 | A1* | 2/2019 | Gao | G06F 3/0674 |
| 2019/0179761 | A1* | 6/2019 | Gupta | G06F 12/0871 |
| 2020/0136943 | A1* | 4/2020 | Banyai | H04L 67/1097 |
| 2020/0183847 | A1* | 6/2020 | Patel | G06F 12/0868 |
| 2021/0365379 | A1* | 11/2021 | Creed | G06F 3/0656 |

OTHER PUBLICATIONS 1.2.2 Set Operations; Introduction to Probability, Statistics and Random Processes; Sep. 5, 2018; retrieved from https://web.archive.org/web/20180905075829/https://www.probabilitycourse.com/chapter1/1_2_2_set_operations.php on May 20, 2024 (Year: 2018).*
Machine translation of "Docker container basic technology: introduction to linux cgroup"; Aug. 25, 2017; retrieved from https://cizixs.com/2017/08/25/linux-cgroup/ on May 20, 2024 (Year: 2017).*
Red Hat Enterprise Linux 6 Resource Management Guide; Prpic et al.; Dec. 6, 2011; retrieved from https://linux-archive.web.cern.ch/scientific6/docs/rhel/Resource_Management_Guide/#appe-Resource_Management_Guide-Revision_History (Year: 2011).*
Anonymous:"Chapter 3. Subsystems and Tunable Parameters-Red Hat Customer Portal", Mar. 30, 2019, XP093118894,26 pages.
Blog "Docker Container Fundamentals: Introduction to Linux cgroups", Aug. 25, 2017, with the English translation, 39 pages.
Xiaomin0322 "Cgroup limits CPU, IO, memory, and scheduling policies in Linux systems" Jul. 2, 2019, with the English translation, 28 pages.

* cited by examiner

MEMORY MANAGEMENT METHOD AND APPARATUS

CROSS-REFERENCE TO RELATED APPLICATIONS

This application is a continuation of International Application No. PCT/CN2021/120865, filed on Sep. 27, 2021, which claims priority to Chinese Patent Application No. 202011066092.5, filed on Sep. 30, 2020. The disclosures of the aforementioned applications are hereby incorporated by reference in their entireties.

TECHNICAL FIELD

This disclosure relates to the field of computer application technologies, and more specifically, to a memory management method and apparatus.

BACKGROUND

With continuous development of cloud technologies, to save resources and improve server utilization, a plurality of processes of a plurality of tenants usually run on a same server in a cloud. These processes share various resources on the same server, but resource sharing also causes unfairness. In this case, resource usage of different processes of different tenants may be detected and controlled through resource isolation. This ensures that a task with a higher priority obtains abundant resources, and ensures that tasks with a same priority obtain same resources.

Read/write of storage resources on a server, namely, storage input/output (I/O), may be classified into direct I/O and buffered I/O. In, direct I/O, reading or writing is directly performed on a storage device. In buffered I/O, a memory is used as a buffer for storage, and when data is read or written, the data is first buffered and then returned to an application or written into a storage device. In an existing Linux system, a control group (cgroup) technology is used to perform throttling on buffered I/O.

For buffered I/O, traffic statistics need to be collected for each cgroup, and throttling needs to be performed on buffered I/O based on a traffic statistics result. However, currently, accuracy of the traffic statistics result of the cgroup is low.

SUMMARY

This disclosure provides a memory management method and apparatus, to improve accuracy of a traffic statistics result of a cgroup so that throttling of buffered I/O can be more fair and accurate.

According to a first aspect, a memory management method is provided. The method includes:
obtaining a read/write request of a first control group (cgroup), where the first cgroup is one of a plurality of cgroups, and the read/write request is used to request to read or write target data from or into a target cache page; when a read/write operation is performed based on the read/write request, updating, based on the read/write operation, a first record table of the target cache page to obtain an updated first record table, where the read/write operation is to read or write the target data from or into the target cache page, the first record table includes a second cgroup and a quantity of times that the target data is read or written by the second cgroup, and the second cgroup is a cgroup in the plurality of cgroups that has read or written the target data from or into the target cache page; and indicating, based on a quantity of times that the first cgroup reads or writes the target data and that is recorded in the updated first record table, to perform throttling on the first cgroup.

In this embodiment of this disclosure, the updated first record table records all cgroups that have read or written the target data from or into the target cache page. All the cgroups include a union set of the first cgroup and the second cgroup, and a quantity of times that the target data is read or written by all the cgroups, to improve accuracy of a traffic statistics result of the cgroup. In this case, throttling is performed on the first cgroup based on the updated first record table, so that throttling on the first cgroup can be more fair and accurate.

In the foregoing solution, the second cgroup is a cgroup in the plurality of cgroups that has read or written the target data from or into the target cache page. Therefore, if the first cgroup has accessed the target cache page before a current access, the second cgroup can include the first cgroup. Similarly, if the current access is a first access to the target cache page, the second cgroup may be empty.

This solution is applied to a physical host, a virtual machine, or a container (for example, Docker), and can be used to perform refined management on a data access status and a traffic occupation status of each cgroup in the physical host, the virtual machine, or the container (for example, Docker).

A record table is correspondingly set for each target cache page in this solution. The record table is used to record data read or written by each cgroup in the physical host, the virtual machine, or the container (for example, Docker) for the target cache page (each record table corresponds to only one action of reading or writing).

Generally, a cgroup may correspond to one or more processes (threads, system logs, other applications, or the like). A data access status and a traffic usage status of the cgroup are recorded (or collected), to perform throttling on the one or more processes (the threads, the system logs, the other applications, or the like) corresponding to the cgroup.

In some embodiments, before the updating a first record table of the target cache page based on the read/write operation to obtain an updated first record table, the method may further include: determining whether the first cgroup is throttled; and when the first cgroup is not throttled, performing the read/write operation based on the read/write request.

Alternatively, whether the first cgroup is throttled may not be determined, and the read/write operation may be directly performed based on the read/write request. This is not limited in this embodiment of this disclosure.

In addition, in this embodiment of this disclosure, a sequence of the two actions of the read/write operation and updating the first record table is not limited either.

For example, the read/write operation may be first performed based on the read/write request, and then the first record table is updated based on the read/write operation, to obtain the updated first record table.

Alternatively, when the read/write operation is performed based on the read/write request, the first record table may be first updated based on the read/write operation to obtain the updated first record table, and then the read/write operation is performed based on the read/write request.

Alternatively, when the read/write operation is performed based on the read/write request, the first record table may be updated based on the read/write operation, and the read/write operation is performed based on the read/write request.

Further, the performing throttling on the first cgroup may be prohibiting the first cgroup from performing the read/write operation in a cache (for example, the cache herein may refer to all cache pages including the target cache page); or limiting a read or write speed of the first cgroup in the cache (for example, the cache herein may refer to all the cache pages including the target cache page).

For example, an access record (for example, the access record may indicate all processes that have accessed each cache page and corresponding records) of each cache page in the cache may be obtained from a page cache mechanism of the operating system. The first cgroup may correspond to one or more processes. In this case, a quantity of times that the one or more processes read another cache page may be determined with reference to the access record. Throttling is performed on the first cgroup based on the updated first record table and the quantity of times that the another cache page is read.

In addition, performing throttling on the first cgroup may be performing throttling only on a read operation, performing throttling only on a write operation, or performing throttling on both a read operation and a write operation. This is not limited in this embodiment of this disclosure.

It should be noted that the foregoing embodiment is merely an example rather than a limitation. For a specific throttling method, refer to the conventional technology. This is not limited in this embodiment of this disclosure.

With reference to the first aspect, in some embodiments of the first aspect, the first record table further indicates an amount of data read or written by the second cgroup. The updating a first record table of the target cache page based on the read/write request to obtain an updated first record table includes: reallocating, based on a preset policy, the amount of the data read or written by the second cgroup; and updating the first record table based on the read/write request and the reallocated amount of the data read or written by the second cgroup, to obtain the updated first record table.

In this embodiment of this disclosure, based on the preset policy, the amount of the data is reallocated (e.g., read or written) among all cgroups that have read or written the target data from or into the target cache page. The reallocated amount of the data is recorded in the updated first record table, so that statistics of the amount of the data can be more fair and accurate. In this case, throttling is performed on the first cgroup based on the updated first record table, so that throttling on the first cgroup can be more fair and accurate.

With reference to the first aspect, in some embodiments of the first aspect, the reallocating, based on a preset policy, the amount of the data read or written by the second cgroup includes: reallocating, based on a quantity of cgroups in a union set of the first cgroup and the second cgroup, an amount of data read or written by each cgroup in the union set.

For example, the amount of the data read or written by each cgroup in the union set is averagely calculated based on a total quantity of the cgroups in the union set. To be specific, if there are totally 5 cgroups, the amount of the data read or written by each cgroup is denoted as ⅕ of a total amount of the target data.

With reference to the first aspect, in some embodiments of the first aspect, the reallocating, based on a preset policy, the amount of the data read or written by the second cgroup includes: reallocating, based on a quantity of times of reading or writing of each cgroup in a union set of the first cgroup and the second cgroup in the updated first record table, an amount of data read or written by each cgroup in the union set.

For example, the amount of the data read or written by each cgroup in the union set is calculated based on a ratio of the quantity of times of reading or writing of each cgroup in the union set to the total quantity of the times of reading or writing. To be specific, if there are totally 100 times of reading or writing of the cgroups, and a quantity of times of reading or writing of a cgroup is 25, the amount of the data read or written by the cgroup is denoted as ¼ of the total amount of the target data.

With reference to the first aspect, in some embodiments of the first aspect, the performing throttling on the first cgroup based on a quantity of times that the first cgroup reads or writes the target data and that is recorded in the updated first record table includes: obtaining, based on the quantity of the times that the first cgroup reads or writes the target data and that is recorded in the updated first record table, an amount of data read or written by the first cgroup, and indicating, based on an amount of data that is read or written by the first cgroup, to perform throttling on the first cgroup.

The performing throttling on the first cgroup based on the quantity of times that the first cgroup reads or writes the target data and the amount of the data read or written by the first cgroup that are recorded in the updated first record table may be performing throttling based on a quantity of access times of a single cache page. For example, when a quantity of access times or an amount of the data in a current record table exceeds an upper limit, throttling is performed on the first cgroup. Alternatively, a total quantity of times of reading or writing of the first cgroups in all global record tables is obtained based on a quantity of access times or an amount of the data in the current record table. Alternatively, a total amount of data that is read or written is used to determine whether to indicate to limit the first cgroup.

With reference to the first aspect, in some embodiments of the first aspect, after the obtaining a request that a first embodiment requests to read target data from a target cache page, the method further includes: initializing the first record table when there is no target data on the target cache page; and reading the target data from a storage device to the target cache page.

In this embodiment of this disclosure, when there is no target data on the target cache page, the first record table is initialized. This helps the first record table record information about reading the target data by the cgroup.

In some embodiments, in this embodiment of this disclosure, a sequence of the three actions of initializing the first record table, reading the target data to the target cache page, and updating the first record table is not limited either.

For example, when there is no target data on the target cache page and the read/write request is used to request to read the target data from the target cache page, the first record table may be initialized first, then the target data is read from the storage device to the target cache page, and then the first record table is updated.

Alternatively, when there is no target data on the target cache page and the read/write request is used to request to read the target data from the target cache page, the target data may be first read from a storage device to the target cache page, then the first record table is updated, and then the first record table is initialized.

It should be noted that the foregoing embodiment is merely an example rather than a limitation. In this embodiment of this disclosure, a sequence of the three actions of initializing the first record table, reading the target data to the target cache page, and updating the first record table is not limited.

With reference to the first aspect, in some embodiments of the first aspect, after the obtaining a request that a first embodiment requests to write target data into a target cache page, the method further includes: initializing the first record table when there is no target data on the target cache page; and writing the target data into the target cache page.

In this embodiment of this disclosure, when there is no target data on the target cache page, the first record table is initialized. This helps the first record table record information about writing the target data into the cgroup.

In some embodiments, in this embodiment of this disclosure, a sequence of the three actions of initializing the first record table, writing the target data into the target cache page, and updating the first record table is not limited either.

For a specific method, refer to the description in the foregoing embodiment. Details are not described herein again.

According to a second aspect, a memory management apparatus is provided, including:
an obtaining unit, configured to obtain a read/write request of a first embodiment, where the first cgroup is one of a plurality of cgroups, and the read/write request is used to request to read or write target data from or into a target cache page; an update unit, configured to: when a read/write operation is performed based on the read/write request, update, based on the read/write operation, a first record table of the target cache page to obtain an updated first record table, where the read/write operation is to read or write the target data from or into the target cache page, the first record table includes a second cgroup and a quantity of times that the target data is read or written by the second cgroup, and the second cgroup is a cgroup in the plurality of cgroups that has read or written the target data from or into the target cache page; and a throttling unit, configured to indicate, based on a quantity of times that the first cgroup reads or writes the target data and that is recorded in the updated first record table, to perform throttling on the first cgroup.

In this embodiment of this disclosure, the updated first record table records all cgroups that have read or written the target data from or into the target cache page. All the cgroups may include a union set of the first cgroup and the second cgroup, and a quantity of times that the target data is read or written by all the cgroups, to improve accuracy of a traffic statistics result of the cgroup. In this case, throttling is performed on the first cgroup based on the updated first record table, so that throttling on the first cgroup can be more fair and accurate.

In the foregoing solution, the second cgroup is a cgroup in the plurality of cgroups that has read or written the target data from or into the target cache page. Therefore, if the first cgroup has accessed the target cache page before a current access, the second cgroup may include the first cgroup. Similarly, if the current access is a first access to the target cache page, the second cgroup may be empty.

This solution is applied to a physical host, a virtual machine, or a container (for example, Docker), and can be used to perform refined management on a data access status and a traffic occupation status of each cgroup in the physical host, the virtual machine, or the container (for example, Docker).

A record table is correspondingly set for each target cache page in this solution. The record table is used to record data read or written by each cgroup in the physical host, the virtual machine, or the container (for example, Docker) for the target cache page (each record table corresponds to only one action of reading or writing).

Generally, a cgroup may correspond to one or more processes (threads, system logs, other applications, or the like). A data access status and a traffic usage status of the cgroup are recorded (or collected), to perform throttling on the one or more processes (the threads, the system logs, the other applications, or the like) corresponding to the cgroup.

In some embodiments, before the updating the first record table of the target cache page based on the read/write operation to obtain the updated first record table, the method may further include: determining whether the first cgroup is throttled; and when the first cgroup is not throttled, performing the read/write operation based on the read/write request.

Alternatively, whether the first cgroup is throttled may not be determined, and the read/write operation may be directly performed based on the read/write request. This is not limited in this embodiment of this disclosure.

In addition, in this embodiment of this disclosure, a sequence of the two actions of the read/write operation and updating the first record table is not limited either.

For example, the read/write operation may be first performed based on the read/write request, and then the first record table is updated based on the read/write operation, to obtain the updated first record table.

Alternatively, when the read/write operation is performed based on the read/write request, the first record table may be first updated based on the read/write operation to obtain the updated first record table, and then the read/write operation is performed based on the read/write request.

Alternatively, when the read/write operation is performed based on the read/write request, the first record table may be updated based on the read/write operation, and the read/write operation is performed based on the read/write request.

Further, the performing throttling on the first cgroup may be prohibiting the first cgroup from performing the read/write operation in a cache (for example, the cache herein may refer to all cache pages including the target cache page); or limiting a read or write speed of the first cgroup in the cache (for example, the cache herein may refer to all the cache pages including the target cache page).

For example, an access record (for example, the access record may indicate all processes that have accessed each cache page and corresponding records) of each cache page in the cache may be obtained from a page cache mechanism of the operating system. The first cgroup may correspond to one or more processes. In this case, a quantity of times that the one or more processes read another cache page may be determined with reference to the access record. Throttling is performed on the first cgroup based on the updated first record table and the quantity of times that the another cache page is read.

In addition, performing throttling on the first cgroup may be performing throttling only on a read operation, performing throttling only on a write operation, or performing throttling on both a read operation and a write operation. This is not limited in this embodiment of this disclosure.

It should be noted that the foregoing embodiment is merely an example rather than a limitation. For a specific throttling method, refer to the conventional technology. This is not limited in this embodiment of this disclosure.

With reference to the second aspect, in some embodiments of the second aspect, the first record table further indicates an amount of data read or written by the second cgroup, and the update unit is specifically configured to: reallocate, based on a preset policy, the amount of the data read or written by the second cgroup; and update the first record table based on the read/write request and the reallocated amount of the data read or written by the second cgroup, to obtain the updated first record table.

In this embodiment of this disclosure, based on the preset policy, the amount of the data is reallocated (e.g., read or written) among all cgroups that have read or written the target data from or into the target cache page. The reallocated amount of the data is recorded in the updated first record table, so that statistics of the amount of the data can be more fair and accurate. In this case, throttling is performed on the first cgroup based on the updated first record table, so that throttling on the first cgroup can be more fair and accurate.

With reference to the second aspect, in some embodiments of the second aspect, the update unit is specifically configured to: reallocate, based on a quantity of cgroups in a union set of the first cgroup and the second cgroup, an amount of data read or written by each cgroup in the union set.

With reference to the second aspect, in some embodiments of the second aspect, the update unit is specifically configured to: reallocate, based on a quantity of times of reading or writing of each cgroup in a union set of the first cgroup and the second cgroup in the updated first record table, an amount of data read or written by each cgroup in the union set.

With reference to the second aspect, in some embodiments of the second aspect, the throttling unit is specifically configured to: obtain, based on the quantity of times that the first cgroup reads or writes the target data and that is recorded in the updated first record table, an amount of data read or written by the first cgroup, and indicate to perform throttling on the first cgroup based on the amount of data read or written by the first cgroup.

The performing throttling on the first cgroup based on a quantity of times that the first cgroup reads or writes the target data and an amount of the data read or written by the first cgroup that are recorded in the updated first record table may be performing throttling based on a quantity of access times of a single cache page. For example, when a quantity of access times or an amount of the data in a current record table exceeds an upper limit, throttling is performed on the first cgroup. Alternatively, a total quantity of times of reading or writing of the first cgroups in all global record tables is obtained based on a quantity of access times or an amount of the data in the current record table. Alternatively, a total amount of data that is read or written is used to determine whether to indicate to limit the first cgroup.

With reference to the second aspect, in some embodiments of the second aspect, after the obtaining a request that the first control group cgroup requests to read the target data from the target cache page, the read/write unit is further configured to: initialize the first record table when there is no target data on the target cache page; and read the target data from a storage device to the target cache page.

In this embodiment of this disclosure, when there is no target data on the target cache page, the first record table is initialized. This helps the first record table record information about reading the target data by the cgroup.

In some embodiments, in this embodiment of this disclosure, a sequence of the three actions of initializing the first record table, reading the target data to the target cache page, and updating the first record table is not limited either.

For example, when there is no target data on the target cache page and the read/write request is used to request to read the target data from the target cache page, the first record table may be initialized first, then the target data is read from the storage device to the target cache page, and then the first record table is updated.

Alternatively, when there is no target data on the target cache page and the read/write request is used to request to read the target data from the target cache page, the target data may be first read from a storage device to the target cache page, then the first record table is updated, and then the first record table is initialized.

It should be noted that the foregoing embodiment is merely an example rather than a limitation. In this embodiment of this disclosure, a sequence of the three actions of initializing the first record table, reading the target data to the target cache page, and updating the first record table is not limited.

With reference to the second aspect, in some embodiments of the second aspect, after the obtaining a request that the first control group (cgroup) requests to write the target data into the target cache page, the read/write unit is further configured to: initialize the first record table when there is no target data on the target cache page; and write the target data into the target cache page.

In this embodiment of this disclosure, when there is no target data on the target cache page, the first record table is initialized. This helps the first record table record information about writing the target data into the cgroup.

In some embodiments, in this embodiment of this disclosure, a sequence of the three actions of initializing the first record table, writing the target data into the target cache page, and updating the first record table is not limited either.

For a specific method, refer to the description in the foregoing embodiment. Details are not described herein again.

According to a third aspect, a memory management apparatus is provided. The apparatus includes a storage medium and a central processing unit, the storage medium may be a non-volatile storage medium, and the storage medium stores a computer-executable program. The central processing unit is connected to the non-volatile storage medium, and executes the computer-executable program to implement the method in the first aspect or any possible embodiment of the first aspect.

According to a fourth aspect, a chip is provided. The chip includes a processor and a data interface, and the processor reads, by using the data interface, instructions stored in a memory, to perform the method in the first aspect or any possible embodiment of the first aspect.

In some embodiments, the chip may further include the memory. The memory stores the instructions. The processor is configured to execute the instructions stored in the memory. When the instructions are executed, the processor is configured to perform the method according to any one of the first aspect or the possible embodiments of the first aspect.

According to a fifth aspect, a computer-readable storage medium is provided. The computer-readable medium stores program code executed by a device, and the program code includes instructions used to perform the method in the first aspect or any possible embodiment of the first aspect.

According to a sixth aspect, a virtual machine is provided. The virtual machine includes the memory management apparatus according to the second aspect or the third aspect.

According to a seventh aspect, a container is provided. The container includes the memory management apparatus according to the second aspect or the third aspect.

According to an eighth aspect, a host is provided. The host includes the memory management apparatus according to the second aspect or the third aspect.

In some embodiments, the host may be a physical host, for example, a cloud server.

In this embodiment of this disclosure, the updated first record table records all the cgroups that have read or written the target data from or into the target cache page. All the cgroups may include the union set of the first cgroup and the second cgroup, and the quantity of times that the target data is read or written by all the cgroups, to improve accuracy of the traffic statistics result of the cgroup. In this case, throttling is performed on the first cgroup based on the updated first record table, so that throttling on the first cgroup can be more fair and accurate.

DESCRIPTION OF EMBODIMENTS

The following describes technical solutions of this disclosure with reference to accompanying drawings.

Cloud computing is to integrate a plurality of servers on a network by using functions such as cluster applications, network technologies, and distributed file systems, and provide functions such as data storage, data processing, and data analysis on a system including the plurality of servers.

To save resources and improve server utilization, a plurality of processes of a plurality of tenants are usually run on a same server in a cloud. These processes share various resources on the same server, for example, a computing resource (for example, a central processing unit (CPU) and a graphics processing unit (GPU)), a storage resource (for example, a conventional hard disk drive (HDD) and a solid state drive (SSD)), a memory resource (for example, a dynamic random access memory (DRAM) and a non-volatile memory (NVM)), and a network resource (for example, remote direct memory access (RDMA)). However, resource sharing also causes unfairness. In this case, resource usage of different processes of different tenants may be detected and controlled through resource isolation. This ensures that a task with a higher priority obtains abundant resources, and ensures that tasks with a same priority obtain same resources.

Currently, read/write of storage resources on a server, namely, storage I/O, may be classified into direct I/O and buffered I/O. Buffered I/O may also be referred to as normal I/O. In direct I/O, data is directly read from or written into a storage device. In buffered I/O, a memory is used as a buffer for storage, and when data is read or written, the data is buffered and then returned to an application or written into a storage device.

Figure 1:
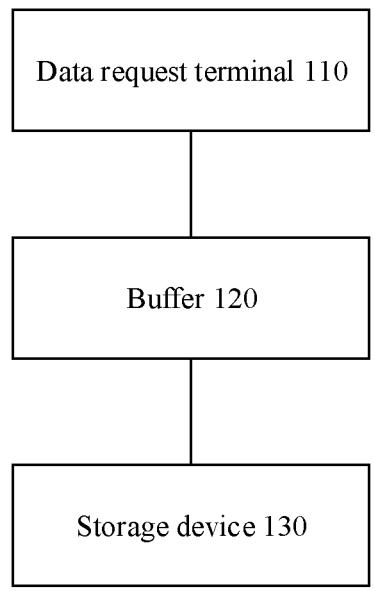
FIG. 1 is a block diagram of an example of buffered I/O according to an embodiment of this disclosure.

For example, FIG. 1 is a block diagram of an example of buffered I/O according to an embodiment of this disclosure. As shown in FIG. 1, a data request terminal 110 may be an application, a process, or a thread in a physical host, a virtual machine, or a container (for example, Docker). A buffer 120 may be a memory buffer, for example, the memory buffer may also be referred to as a page cache. The memory buffer may include a plurality of cache pages, and the cache page may also be referred to as a memory page. A storage device 130 may be a storage device, for example, a hard disk or a magnetic disk.

The data request terminal 110 may send a read request to the buffer 120. If there is to-be read data in the buffer 120, the data request terminal 110 may directly read the data from the buffer 120. If there is no to-be read data in the buffer 120, the buffer 120 may read the data from the storage device 130 and store the data in the buffer 120. Subsequently, the data request terminal 110 may read the data from the buffer 120.

In an existing Linux system, a control group (cgroup) technology may be used to isolate resources. For example, when using a cgroup, an administrator may first create a new cgroup, and configure limits on resources used by the cgroup in terms of a CPU, a memory, storage I/O (input/output), a device, and the like. Subsequently, a new application may be created in the cgroup, or an existing application may be added to the cgroup, to detect and limit, by using the cgroup, system resources used by the application.

When cgroups are used to limit buffered I/O, traffic statistics need to be collected for each cgroup, and throttling needs to be performed on buffered I/O based on a traffic statistics result.

For example, in the conventional technology, when a cache page in a memory buffer is created, it is first determined that each cache page in the memory buffer belongs to one cgroup, and ownership does not change before the memory page is released.

A file node (inode), namely, a file in a file system, may include a plurality of cache pages. A cgroup that occupies a largest quantity of cache pages in all cache pages is selected as a cgroup of the inode based on cgroups to which all the cache pages in the inode belong.

According to a current statistics method, all writeback I/O generated on the inode is counted in the cgroup of the inode. However, this is inaccurate.

For example, when a page1 is created, it is determined that the page1 belongs to a cgroup1. However, after the page1 is created, the page1 is frequently used by a cgroup2. Finally, all I/O of the page1 is incorrectly counted in the cgroup1.

Similarly, because the cgroup of the inode is determined by the cgroup that occupies the largest quantity of the cache pages in the inode, if two cgroups in the inode each occupy a half of the cache pages of the inode, statistic about a half of I/O on the inode is incorrect.

In view of the foregoing problem, this disclosure proposes a memory management method, to improve accuracy of a traffic statistics result of a cgroup, so that throttling of buffered I/O can be more fair and accurate.

The memory management method in embodiments of this disclosure is applicable to various scenarios in which resource isolation (or throttling) is performed on buffered I/O based on a cgroup, for example, a private cloud scenario or a public cloud scenario. Alternatively, the memory management method in embodiments of this disclosure is applied to another scenario in which resource isolation (or throttling) is performed based on a cgroup deployed on a physical host, a virtual machine, or a container (for example, Docker). A specific application scenario is not limited in embodiments of this disclosure.

Figure 2:
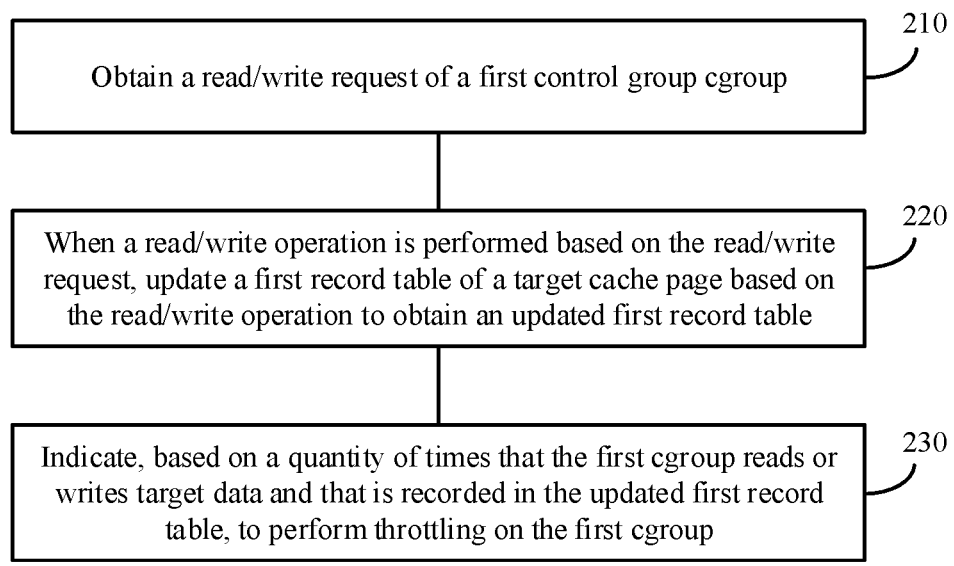
FIG. 2 is a schematic block diagram of a memory management method according to an embodiment of this disclosure.

FIG. 2 is a schematic block diagram of a memory management method 200 according to an embodiment of this disclosure. The method 200 may be performed by a physical host, a virtual machine, or a container (for example, Docker).

It should be understood that FIG. 2 shows steps or operations of the method 200, but these steps or operations are merely examples. Another operation or variation of each operation of the method 200 in FIG. 2 may be performed in this embodiment of this disclosure, or not all operations need to be performed, or these operations may be performed in other sequences.

S210: Obtain a read/write request of a first control group cgroup.

The first cgroup may be one of a plurality of cgroups, and the read/write request may be used to request to read or write target data from or into a target cache page.

The target cache page may be one of a plurality of cache pages included in a file node (inode), and the plurality of cgroups may correspond to the plurality of cache pages.

In some embodiments, each of the plurality of cache pages may correspond to one record table that records a cgroup read/write operation.

For example, the record table corresponding to each cache page may be used to record all cgroups that have read or written data from or into the cache page, a quantity of times that all the cgroups read or write the data, and the like.

In some embodiments, the first cgroup may correspond to one or more processes (threads, system logs, other applications, or the like). In other words, the read/write request of the first cgroup may be actually considered to be triggered by the one or more processes (the threads, the system logs, the other applications, or the like).

Alternatively, it may be understood that the first cgroup may be configured to collect statistics on read and write of the one or more processes (the threads, the system logs, the other applications, or the like) corresponding to the first cgroup, and may perform resource isolation on the one or more processes (the threads, the system logs, the other applications, or the like) based on a statistical result. For example, throttling is performed on the one or more processes (the threads, the system logs, the other applications, or the like).

In some embodiments, after the read/write request of the first cgroup is obtained, the method 200 may be performed in two manners.

Manner 1:

Determine whether throttling is performed on the first cgroup; and when throttling is not performed on the first cgroup, perform a read/write operation based on the read/write request; or when throttling is performed on the first cgroup, skip performing the read/write operation.

Manner 2:

Perform the read/write operation directly based on the read/write request (without determining whether throttling is performed on the first cgroup).

The method 200 may be performed in either Manner 1 or Manner 2. This is not limited in this embodiment of this disclosure.

In some embodiments, the record table that records the cgroup read/write operation and that corresponds to the target cache page may be a first record table.

The read/write operation may be to read or write the target data from or into the target cache page.

For example, when the read/write request is used to request to read the target data from the target cache page, the read/write operation may be to read the target data from the target cache page.

For another example, when the read/write request is used to request to write the target data into the target cache page, the read/write operation may be to write the target data into the target cache page.

In some possible embodiments of this embodiment of this disclosure, when the read/write request is used to request to read the target data from the target cache page, after the read/write request of the first control group cgroup is obtained, the read/write operation is performed in the following two cases based on the read/write request and whether there is the target data on the target cache page.

Case 1: There is no target data on the target cache page.

In this case, the first record table of the target cache page may be initialized, and the target data is read from a storage device (for example, a magnetic disk or a hard disk) to the target cache page.

The first record table may include a second cgroup and a quantity of times that the second cgroup reads or writes the target data, and the second cgroup is a cgroup in the plurality of cgroups that has read or written the target data from or into the target cache page.

For detailed descriptions of the first record table, refer to the subsequent embodiment in S220. Details are not described herein again.

Subsequently, the target data may be read from the target cache page based on the read/write request of the first cgroup.

Case 2: There is the target data on the target cache page.

In this case, the target data may be directly read from the target cache page based on the read/write request of the first cgroup.

Figure 3:
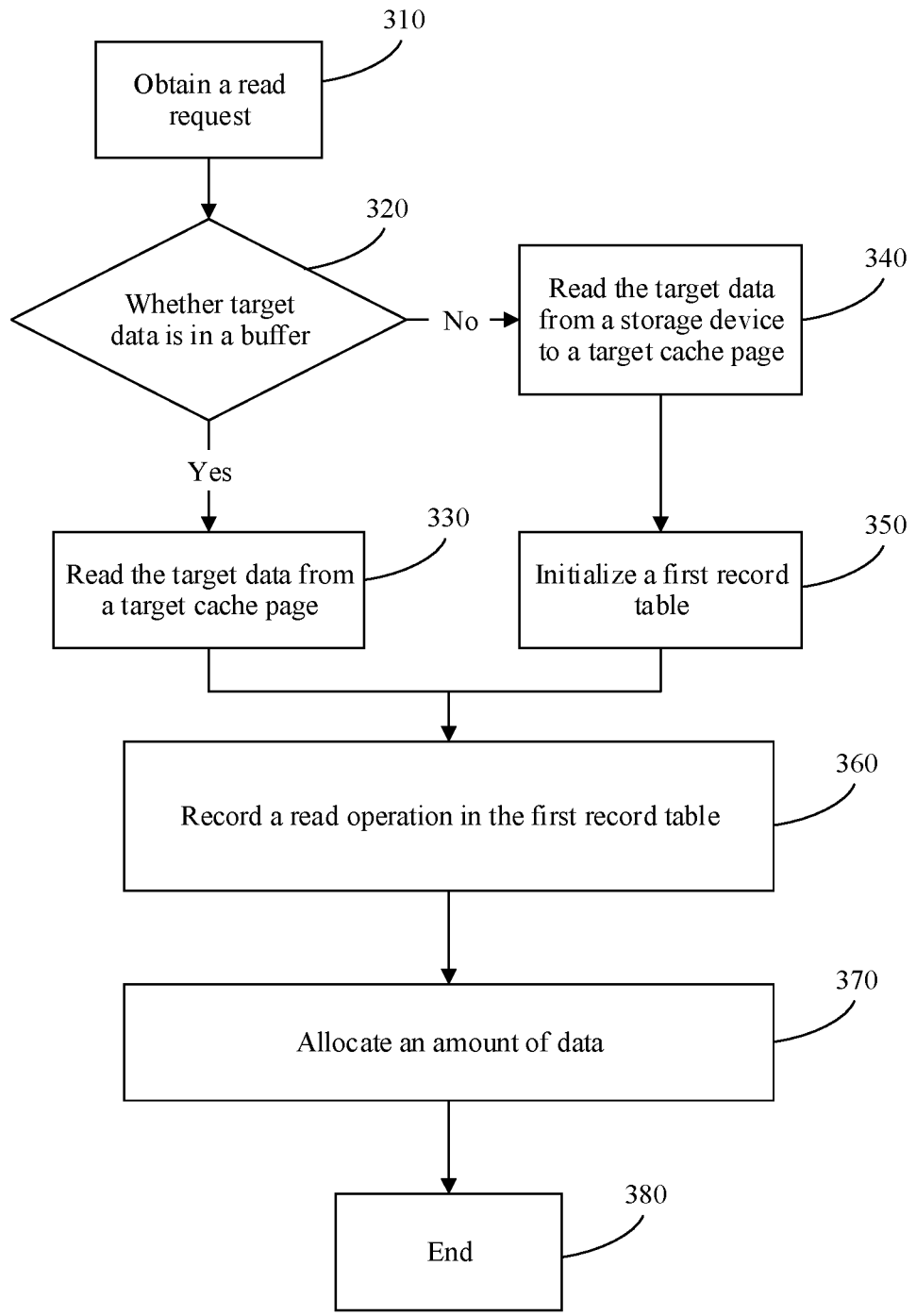
FIG. 3 is a schematic block diagram of a memory management method according to an embodiment of this disclosure.

For detailed descriptions of Case 1 and Case 2, refer to a subsequent embodiment in the method 300 in FIG. 3. Details are not described herein again.

In some embodiments, in this embodiment of this disclosure, a sequence of the three actions of initializing the first record table, reading the target data to the target cache page, and updating the first record table is not limited.

For example, when there is no target data on the target cache page and the read/write request is used to request to read the target data from the target cache page, the first record table may be initialized first, then the target data is read from the storage device to the target cache page, and then the first record table is updated.

Alternatively, when there is no target data on the target cache page and the read/write request is used to request to read the target data from the target cache page, the target data may be first read from a storage device to the target cache page, then the first record table is updated, and then the first record table is initialized.

It should be noted that the foregoing embodiment is merely an example rather than a limitation. In this embodiment of this disclosure, a sequence of the three actions of initializing the first record table, reading the target data to the target cache page, and updating the first record table is not limited.

In some possible embodiments of this embodiment of this disclosure, when the read/write request is used to request to write the target data into the target cache page, after the read/write request of the first control group cgroup is obtained, the read/write operation is performed based on the read/write request and whether there is the target data on the target cache page in the following two cases.

Case 3: There is no target data on the target cache page.

In this case, the first record table of the target cache page may be initialized, and the target data is written into the target cache page.

Subsequently, when a preset condition is met, the target data on the target cache page may be written back (writeback) to a storage device.

Case 4: There is the target data on the target cache page.

In this case, the target data does not need to be written into the target cache page, and the first record table may be directly updated based on the read/write request of the first cgroup.

Figure 4:
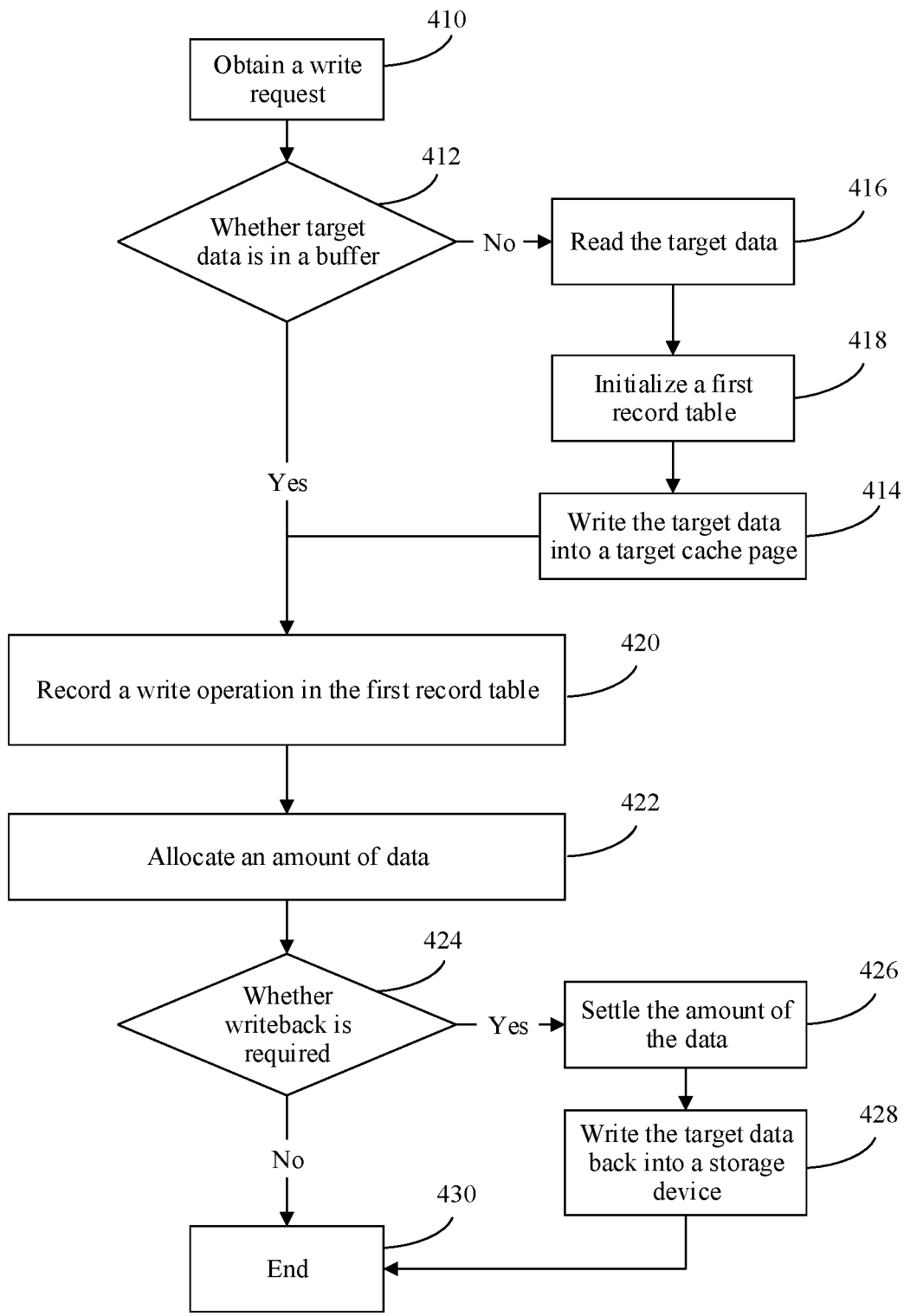
FIG. 4 is a schematic block diagram of a memory management method according to another embodiment of this disclosure.

For detailed descriptions of Case 3 and Case 4, refer to a subsequent embodiment in the method 400 in FIG. 4. Details are not described herein again.

In some embodiments, in this embodiment of this disclosure, a sequence of the three actions of initializing the first record table, writing the target data into the target cache page, and updating the first record table is not limited either.

For a specific method, refer to the description in the foregoing embodiment. Details are not described herein again.

S220: When the read/write operation is performed based on the read/write request, update the first record table of the target cache page based on the read/write operation to obtain an updated first record table.

The first record table may include the second cgroup and a quantity of times that the second cgroup reads the target data, and the second cgroup is a cgroup in the plurality of cgroups that has read the target data from the target cache page.

Alternatively, the first record table may further include the second cgroup and a quantity of times that the second cgroup writes the target data, and the second cgroup is a cgroup in the plurality of cgroups that has written the target data into the target cache page.

It can be learned that the second cgroup may include one or more cgroups, and the second cgroup may also include the first cgroup.

In some embodiments, in this embodiment of this disclosure, a sequence of the two actions of the read/write operation and updating the first record table is not limited either.

For example, the read/write operation may be first performed based on the read/write request, and then the first record table is updated based on the read/write operation, to obtain the updated first record table.

Alternatively, when the read/write operation is performed based on the read/write request, the first record table may be first updated based on the read/write operation to obtain the updated first record table, and then the read/write operation is performed based on the read/write request.

Alternatively, when the read/write operation is performed based on the read/write request, the first record table may be updated based on the read/write operation, and the read/write operation is performed based on the read/write request.

In some embodiments, the updating the first record table of the target cache page based on the read/write operation to obtain the updated first record table may be:

recording the read/write operation in the first record table, to obtain the updated first record table.

In other words, the updated first record table may be used to indicate the first cgroup and the second cgroup that are in the plurality of cgroups and that have read the target data from the target cache page, and a quantity of times that the first cgroup and the second cgroup read the target data.

In some embodiments, the first record table may further indicate an amount of data read or written by the second cgroup.

Correspondingly, the updating the first record table of the target cache page based on the read/write operation to obtain the updated first record table may include:

reallocating, based on a preset policy, an amount of data read or written by the second cgroup; and updating the first record table based on the read/write request and the reallocated amount of the data read or written by the second cgroup, to obtain the updated first record table.

In some embodiments, the reallocating, based on a preset policy, an amount of data read or written by the second cgroup may include:

reallocating, based on a quantity of cgroups in a union set of the first cgroup and the second cgroup, an amount of data read or written by each cgroup in the union set.

In other words, the preset policy may be allocating an amount of data of each (read or written) cgroup based on a quantity of (read or written) cgroups.

For example, it is assumed that the target data is 4 kilobytes (KBs), a cgroup1 reads the target data once, and a cgroup2 reads the target data twice. When the preset policy is allocating an amount of data (read or written) based on a quantity of cgroups (read or written), an amount of data read by the cgroup1 is 4 KB/2=2 KB, and an amount of data read by the cgroup2 is also 4 KB/2=2 KB.

Alternatively, the reallocating, based on a preset policy, an amount of data read or written by the second cgroup may also include:

reallocating, based on a quantity of times of reading or writing of each cgroup in a union set of the first cgroup and the second cgroup in the updated first record table, an amount of data read or written by each cgroup in the union set.

In other words, the preset policy may also be allocating an amount of data of each cgroup (read or written) based on a quantity of times of reading or writing.

For example, it is assumed that the target data is 4 kilobytes (KBs), a cgroup1 reads the target data once, a cgroup2 reads the target data twice, and a cgroup3 reads the target data once. When the preset policy may also be allocating the amount of the data of each cgroup (read or written) based on the quantity of the times of reading or writing, the amount of the data read by the cgroup1 is 4 KB/4=1 KB, the amount of the data read by the cgroup2 is (4 KB/4)*2=2 KB, and an amount of data read by the cgroup3 is 4 KB/4=1 KB.

It should be noted that the foregoing embodiment is merely an example rather than a limitation, and specific content of the preset policy is not limited in this embodiment of this disclosure.

S230: Indicate, based on a quantity of times that the first cgroup reads or writes the target data and that is recorded in the updated first record table, to perform throttling on the first cgroup.

In some embodiments, an amount of data read or written by the first cgroup may be obtained based on the quantity of the times that the first cgroup reads or writes the target data and that is recorded in the updated first record table, and throttling is indicated to be performed on the first cgroup based on the amount of the data read or written by the first cgroup.

The performing throttling on the first cgroup based on a quantity of times that the first cgroup reads or writes the target data and an amount of the data read or written by the first cgroup that are recorded in the updated first record table may be performing throttling based on a quantity of access times of a single cache page. For example, when a quantity of access times or an amount of the data in a current record table exceeds an upper limit, throttling is performed on the first cgroup. Alternatively, a total quantity of times of reading or writing of the first cgroups in all global record tables is obtained based on a quantity of access times or an amount of the data in the current record table. Alternatively, a total amount of data that is read or written is used to determine whether to indicate to limit the first cgroup.

Further, the performing throttling on the first cgroup may be prohibiting the first cgroup from performing the read/write operation in a cache (for example, the cache herein may refer to all cache pages including the target cache page); or limiting a read or write speed of the first cgroup in the cache (for example, the cache herein may refer to all the cache pages including the target cache page).

For example, an access record (for example, the access record may indicate all processes that have accessed each cache page and corresponding records) of each cache page in the cache may be obtained from a page cache mechanism of the operating system. The first cgroup may correspond to one or more processes. In this case, a quantity of times that the one or more processes read another cache page may be determined with reference to the access record. Throttling is performed on the first cgroup based on the updated first record table and the quantity of times that the another cache page is read.

In addition, performing throttling on the first cgroup may be performing throttling only on a read operation, performing throttling only on a write operation, or performing throttling on both a read operation and a write operation. This is not limited in this embodiment of this disclosure.

It should be noted that the foregoing embodiment is merely an example rather than a limitation. For a specific throttling method, refer to the conventional technology. This is not limited in this embodiment of this disclosure.

Refer to FIG. 3. The following describes in detail the memory management method in embodiments of this disclosure by using an example in which a read/write request of a first cgroup may be used to request to read target data from a target cache page (that is, the read/write request is a read request).

FIG. 3 is a schematic block diagram of a memory management method 300 according to an embodiment of this disclosure. The method 300 may be performed by a physical host, a virtual machine, or a container (for example, Docker).

It should be understood that FIG. 3 shows steps or operations of the method 300, but these steps or operations are merely examples. Another operation or variation of each operation of the method 300 in FIG. 3 may be performed in this embodiment of this disclosure, or not all operations need to be performed, or these operations may be performed in other sequences.

S310: Obtain a read request.

The read request may be a read request of a first cgroup, and the read request may be used to request to read target data from a buffer.

The first cgroup may correspond to one or more processes (threads, system logs, other applications, or the like). In other words, it may be considered that the read request is triggered by a process, a thread, a system log, another application, or the like.

S320: Determine whether the target data is in the buffer.

The buffer may be a memory buffer, the buffer may include a plurality of cache pages (pages), and each of the plurality of cache pages may correspond to one record table.

For example, the record table corresponding to each cache page may be used to record a cgroup that has read target data from each cache page, a quantity of times that the cgroup reads the target data, and the like.

It should be noted that the record table records the cgroup in which the target data has been read from each cache page. In other words, the cgroup may refer to one or more cgroups.

For a specific method for determining whether the target data is in the buffer, refer to the conventional technology. This is not limited in this embodiment of this disclosure.

As shown in FIG. 3, if the target data is in the buffer (for example, the target data may be in a target cache page of the plurality of cache pages included in the buffer), S330 is performed; otherwise, S340 is performed.

S330: Read the target data from the target cache page.

In some embodiments, the target data may be directly read from the target cache page based on the read request.

S340: Read the target data from a storage device to the target cache page.

In some embodiments, the target data may be read from the storage device (for example, a disk or a hard disk) to the target cache page, and then the target data may be read from the target cache page based on the read request.

S350: Initialize a first record table.

In some embodiments, the first record table corresponding to the target cache page may be initialized.

S360: Record the read operation in the first record table.

The read operation may refer to the operation of reading the target data from the target cache page based on the read request in S330 and S340.

In some embodiments, when the target data is on the target cache page, the first record table may include information used to indicate a second cgroup, in the plurality of cgroups, that has read the target data from the target cache page and a quantity of times the second cgroup reads the target data.

It should be noted that the second cgroup may refer to the cgroup in the plurality of cgroups that reads the target data from the target cache page. In other words, the second cgroup may include one or more cgroups.

For ease of description, a record table (that is, the first record table in which the read operation has been recorded) after the read operation may be recorded as a second record table.

Further, the first record table may further include information used to indicate an amount of data read by the second cgroup. Correspondingly, an amount of data read by the first cgroup may also be recorded in the first record table. To be specific, the second record table may also include information used to indicate the amount of the data read by the first cgroup and the amount of the data read by the second cgroup.

S370: Allocate an amount of data.

In some embodiments, the amount of the data of the target data that is read from each cgroup (one or more cgroups) and that is recorded in the second record table may be allocated based on a preset policy with reference to the second record table.

For an allocation method of the amount of the data, refer to the embodiment in the method 200 in FIG. 2. Details are not described herein again.

S380: End.

Subsequently, throttling may be performed on the first cgroup based on the second record table.

For detailed descriptions of performing throttling on the first cgroup, refer to the embodiment in the method 200. Details are not described herein again.

Refer to FIG. 4. The following describes in detail the memory management method in this embodiment of this disclosure by using an example in which a read/write request of a first cgroup may be used to request to write target data into a target cache page (that is, the read/write request is a write request).

FIG. 4 is a schematic block diagram of a memory management method 400 according to an embodiment of this disclosure. The method 400 may be performed by a physical host, a virtual machine, or a container (for example, Docker).

It should be understood that FIG. 4 shows operations or operations of the method 400, but these operations or operations are merely examples. Another operation or variation of each operation of the method 400 in FIG. 4 may be further performed in this embodiment of this disclosure, or not all operations need to be performed, or these operations may be performed in other sequences.

S410: Obtain a write request.

The write request may be a write request of a first cgroup, and the write request may be used to request to write the target data into a buffer.

The first cgroup may correspond to one or more processes (threads, system logs, other applications, or the like). In other words, it may be considered that the write request is triggered by a process, a thread, a system log, another application, or the like.

S412: Determine whether the target data is in the buffer.

The buffer may be a memory buffer, the buffer may include a plurality of cache pages (page), and each of the plurality of cache pages may correspond to one record table.

For example, the record table corresponding to each cache page may be used to record a cgroup that has written the target data on each cache page, a quantity of times that the cgroup writes the target data, and the like.

It should be noted that the record table records the cgroup in which the target data has been written into each cache page. In other words, the cgroup may refer to one or more cgroups.

For a specific method for determining whether the target data is in the buffer, refer to the conventional technology. This is not limited in this embodiment of this disclosure.

As shown in FIG. 3, if the target data is in the buffer (for example, the target data may be in a target cache page of the plurality of cache pages included in the buffer), S420 is performed; otherwise, S416 is performed.

S414: Write the target data into the target cache page.

In some embodiments, in a case in which the target data is on the target cache page in the buffer, the target data may be directly written into the target cache based on the write request.

S416: Read the target data.

In some embodiments, the target data may be read from a storage device corresponding to the first cgroup.

S418: Initialize a first record table.

In some embodiments, the first record table corresponding to the target cache page may be initialized.

Next, S414 may be performed.

S420: Record the write operation in the first record table.

The write operation may refer to the operation of writing the target data into the target cache page based on the write request in S414.

In some embodiments, when the target data is on the target cache page, the first record table may include information used to indicate a second cgroup, in the plurality of cgroups, that has written the target data into the target cache page and a quantity of times the second cgroup writes the target data.

It should be noted that the second cgroup may refer to the cgroup in the plurality of cgroups that has written the target data into the target cache page. In other words, the second cgroup may include one or more cgroups.

For ease of description, a record table (that is, the first record table in which the write operation has been recorded) after the write operation may be recorded as a second record table.

Further, the first record table may further include information used to indicate an amount of data written by the second cgroup.

Correspondingly, an amount of data written by the first cgroup may also be recorded in the first record table. To be specific, the second record may also include information used to indicate the amount of the data written by the first cgroup and the amount of the data written by the second cgroup.

S422: Allocate an amount of data.

In some embodiments, the amount of the data of the target data that is written into each cgroup (one or more cgroups) and that is recorded in the second record table may be allocated based on a preset policy with reference to the second record table.

For an allocation method of the amount of the data, refer to the embodiment in the method 200 in FIG. 2. Details are not described herein again.

S424: Determine whether writeback is required.

In some embodiments, when a preset condition is met, it may be determined that the target data on the target cache page needs to be written back to the storage device.

The preset condition is not limited in this embodiment of this disclosure.

For a specific method for determining whether writeback is required, refer to the conventional technology. This is not limited in this embodiment of this disclosure.

As shown in FIG. 4, if writeback is required, S426 may be performed; otherwise, S430 may be performed.

S426: Settle the amount of the data.

In some embodiments, an amount of data of each cgroup (for example, the first cgroup and the second cgroup) may be settled based on the amount of the data calculated in S422.

It should be noted that settlement herein may be understood as: recovering and compensating the amount of the data of each cgroup. For a specific settlement method, refer to the following embodiment in the method 500 in FIG. 5. Details are not described herein again.

S428: Write the target data back into the storage device.

In some embodiments, the target data on the target cache page may be written back to the storage device.

S430: End.

Subsequently, throttling may be performed on the first cgroup based on the second record table.

For detailed descriptions of performing throttling on the first cgroup, refer to the embodiment in the method 200. Details are not described herein again.

Figure 5:
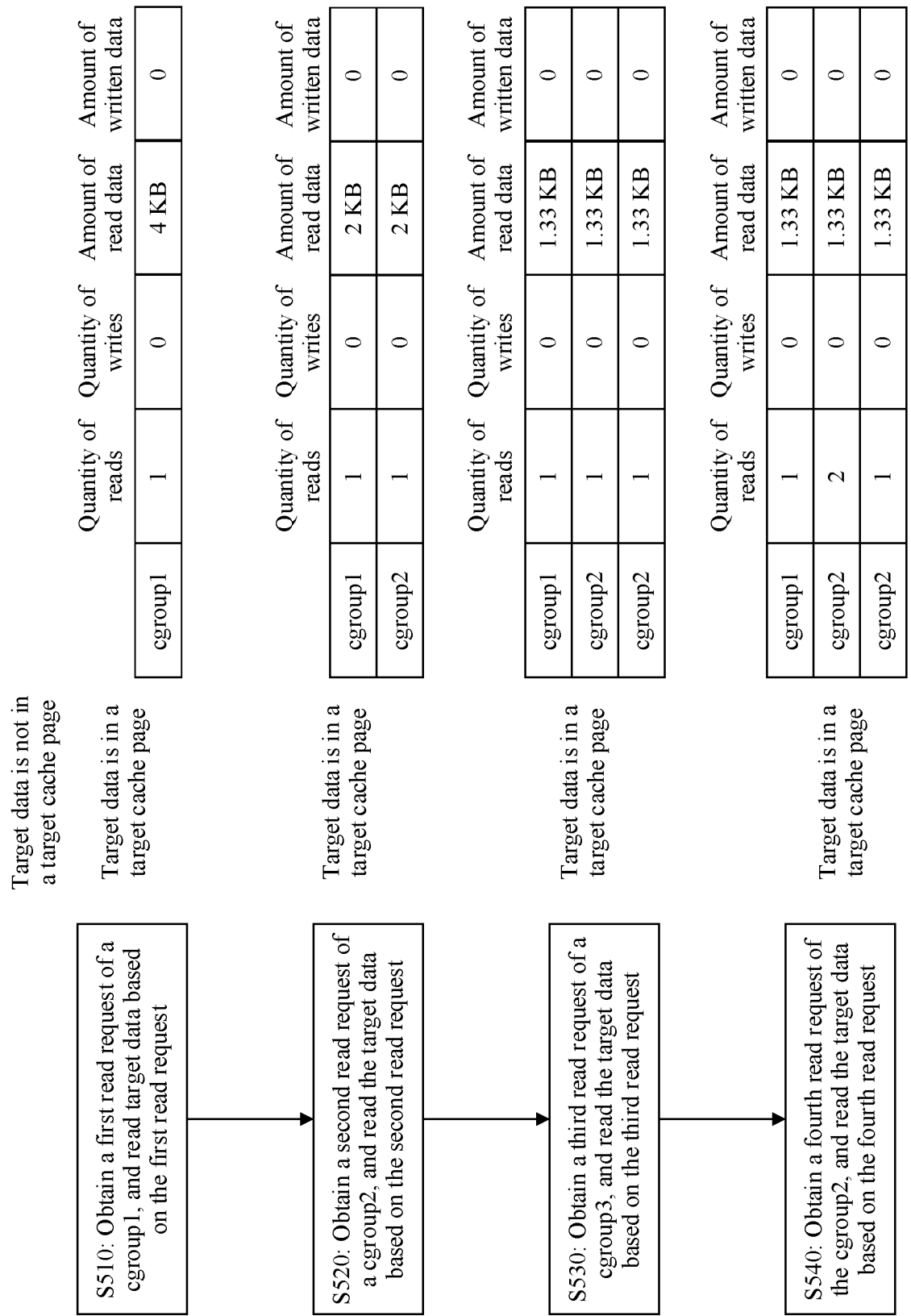
FIG. 5 is a schematic block diagram of a memory management method according to still another embodiment of this disclosure.

FIG. 5 is a schematic block diagram of a memory management method 500 according to an embodiment of this disclosure. The method 500 may be performed by a physical host, a virtual machine, or a container (for example, Docker).

It should be understood that FIG. 5 shows steps or operations of the method 500, but these steps or operations are merely examples. Another operation or variation of each operation of the method 500 in FIG. 5 may be further performed in this embodiment of this disclosure, or not all operations need to be performed, or these operations may be performed in other sequences.

S510: Obtain a first read request of a cgroup1, and read target data based on the first read request.

The first read request is a read request obtained for a first time. As shown in FIG. 5, before the cgroup1 requests to read the target data, the target data is not in a buffer (for example, a target cache page in the buffer). Therefore, the cgroup1 may read the target data into the target cache page through an access device.

The access device herein may refer to a process, a thread, a system log, another application, or the like that triggers the read request.

In addition, a record table corresponding to the target cache page may be created. As shown in FIG. 5, the record table may include a quantity of reads, a quantity of writes, an amount of read data, and an amount of written data of each cgroup (performed on the target cache page).

An I/O read volume of 4 KB is calculated in the cgroup1.

For example, it is assumed that the target data is 4 kilobytes (KBs). After the target data is read from the target cache page for the first time based on the first read request of the cgroup1, as shown in FIG. 5, the first record table records that an amount of read data of the cgroup1 is 4 KB, and a quantity of reads of the cgroup1 is 1.

S520: Obtain a second read request of a cgroup2, and read the target data based on the second read request.

When the cgroup2 requests to read the target data in the buffer, because the target data has been buffered on the target cache page, the cgroup2 may directly read the target data from the target cache page.

In this case, a total of two cgroups (the cgroup1 and the cgroup2) have accessed the target data on the target cache page. To ensure fairness and accuracy of traffic statistics (that is, data statistics), a read amount of the data of each cgroup (that has accessed the target cache page) needs to be recalculated. In other words, the two cgroups equally share an amount of data of the target data.

As shown in FIG. 5, in this case, the amount of the read data of the cgroup1 may be modified to 2 KB in the first record table. In addition, an amount of read data of the cgroup2 is recorded as 2 KB. A quantity of reads of the cgroup2 is 1.

However, a 4 KB amount of data has been calculated in the cgroup1. Therefore, a 2 KB amount of data needs to be compensated for cgroup1.

In this case, if the amount of the data of the cgroup1 is settled, an upper limit of an allowed read amount of the cgroup1 may be increased by 2 KB in a next time period. If the amount of the data of the cgroup1 is not settled, the upper limit of the allowed read amount of the cgroup1 may be directly increased by 2 KB in a current time period. Correspondingly, for the cgroup2, the 2 KB amount of the data is directly calculated in the current read amount of the data.

S530: Obtain a third read request of a cgroup3, and read the target data based on the third read request.

When the cgroup3 requests to read the target data in the buffer, because the target data has been buffered on the target cache page, the cgroup3 may also directly read the target data from the target cache page.

In this case, a total of three cgroups (the cgroup1, the cgroup2, and the cgroup3) have accessed the target data on the target cache page. To ensure fairness and accuracy of traffic statistics (that is, data statistics), the read amount of the data of each cgroup (that has accessed the target cache page) needs to be recalculated. In other words, the three cgroups equally share the amount of the data of the target data.

As shown in FIG. 5, in this case, in the first record table, the amount of the read data of the cgroup1 may be modified to 1.33 KB, and the amount of the read data of the cgroup2 may be modified to 1.33 KB. In addition, an amount of read data of the cgroup3 is recorded as 1.33 KB. A quantity of reads of the cgroup3 is 1.

S540: Obtain a fourth read request of the cgroup2, and read the target data based on the fourth read request.

When the cgroup2 requests to read the target data in the buffer again, because the target data has been buffered on the target cache page, the cgroup2 may directly read the target data from the target cache page.

In this case, the amount of the data read by each cgroup (the cgroup1, the cgroup2, and the cgroup3) may be reallocated based on a preset policy.

It is assumed that the preset policy may be allocating the amount of the data of each (read) cgroup based on a quantity of (read) cgroups, the amount of the data may be allocated based on a quantity of cgroups that access the target cache page. As shown in FIG. 5, in this case, the read amount of the data of each cgroup does not change, and recovery and compensation of the amount of the data do not need to be performed.

As shown in FIG. 5, in this case, the quantity of the times of reading the cgroup2 may be changed to 2 in the first record table, and the read amount of the data of each cgroup does not change.

Subsequently, a cgroup accessing the target cache page and an amount of read data of the cgroup may be recorded in a similar manner, and recovery and compensation of an amount of data are performed on each cgroup based on a preset policy.

When reading ends or throttling needs to be performed on an access device, the first cgroup is throttled based on the first record table.

For detailed descriptions of performing throttling on the first cgroup, refer to the embodiment in the method 200. Details are not described herein again.

Figure 6:
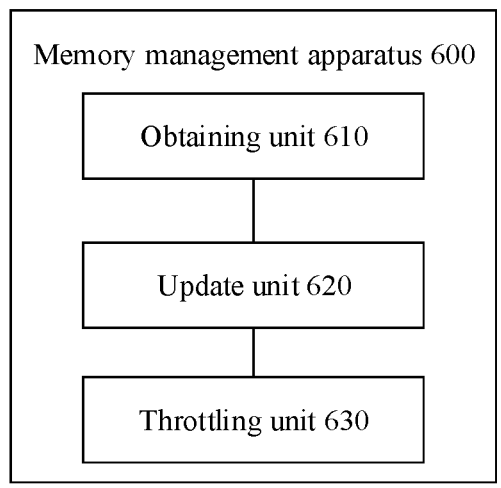
FIG. 6 is a schematic block diagram of a memory management apparatus according to an embodiment of this disclosure.

FIG. 6 is a schematic block diagram of a memory management apparatus 600 according to an embodiment of this disclosure. It should be understood that the memory management apparatus 600 shown in FIG. 6 is merely an example, and the apparatus 600 in this embodiment of this disclosure may further include another module or unit. It should be understood that the apparatus 600 can perform the operations in the methods in FIG. 2, FIG. 3, FIG. 4, and FIG. 5. To avoid repetition, details are not described herein again.

An obtaining unit 610 is configured to obtain a read/write request of a first control group cgroup. The first cgroup is one of a plurality of cgroups. The read/write request is used to request to read or write target data from or into a target cache page.

An update unit 620 is configured to: when a read/write operation is performed based on the read/write request, update a first record table of the target cache page based on the read/write operation to obtain an updated first record table. The read/write operation is to read or write the target data from or into the target cache page. The first record table includes a second cgroup and a quantity of times that the target data is read or written by the second cgroup. The second cgroup is a cgroup in the plurality of cgroups that has read or written the target data from or into the target cache page.

A throttling unit 630 is configured to indicate, based on a quantity of times that the first cgroup reads or writes the target data and that is recorded in the updated first record table, to perform throttling on the first cgroup.

In some embodiments, the first record table further indicates an amount of data read or written by the second cgroup. The update unit 620 is specifically configured to: reallocate, based on a preset policy, the amount of the data read or written by the second cgroup; and update the first record table based on the read/write request and the reallocated amount of the data read or written by the second cgroup, to obtain the updated first record table.

In some embodiments, the update unit 620 is specifically configured to: reallocate, based on a quantity of cgroups in a union set of the first cgroup and the second cgroup, an amount of data read or written by each cgroup in the union set.

In some embodiments, the update unit 620 is specifically configured to: reallocate, based on a quantity of times of reading or writing of each cgroup in a union set of the first cgroup and the second cgroup in the updated first record table, an amount of data read or written by each cgroup in the union set.

In some embodiments, the throttling unit 630 is specifically configured to: obtain, based on the quantity of times that the first cgroup reads or writes the target data and that is recorded in the updated first record table, an amount of data read or written by the first cgroup, and indicate to perform throttling on the first cgroup based on the amount of data read or written by the first cgroup.

In some embodiments, after the obtaining a request that the first control group cgroup requests to read the target data from the target cache page, the update unit 620 is further configured to: initialize the first record table when there is no target data on the target cache page; and read the target data from a storage device to the target cache page.

In some embodiments, after the obtaining a request that the first control group cgroup requests to write the target data into the target cache page, the update unit 620 is further configured to: initialize the first record table when there is no target data on the target cache page; and write the target data into the target cache page.

It should be understood that the memory management apparatus 600 herein is embodied in a form of a functional module. The term "module" herein may be implemented in a form of software and/or hardware. This is not specifically limited. For example, the "module" may be a software program, a hardware circuit, or a combination thereof that implements the foregoing functions. The hardware circuit may include an application-specific integrated circuit (ASIC), an electronic circuit, a processor (for example, a shared processor, a dedicated processor, or a group processor) configured to execute one or more software or firmware programs and a memory, a combined logic circuit, and/or other suitable components that support the described functions.

In an example, the memory management apparatus 600 provided in this embodiment of this disclosure may be a processor in a cloud server, or may be a chip in a cloud server, to perform the method described in embodiments of this disclosure.

Figure 7:
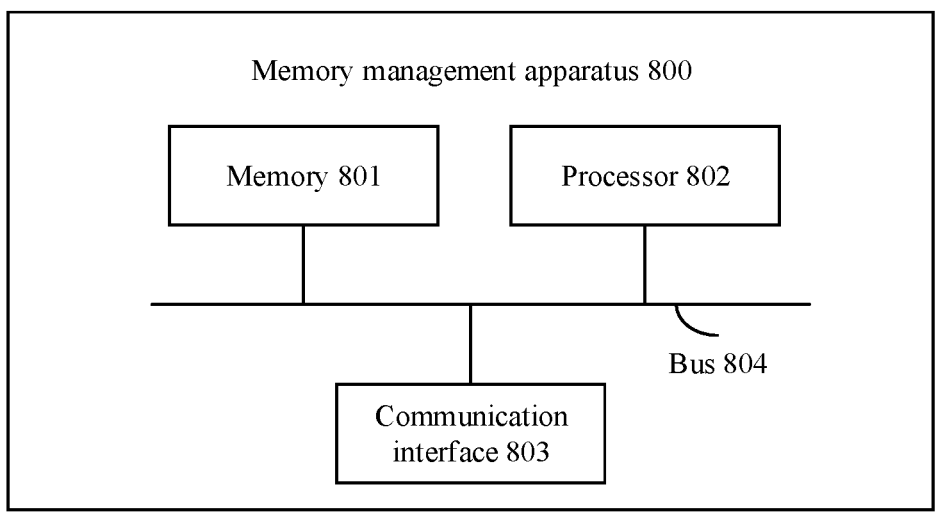
FIG. 7 is a schematic block diagram of a memory management apparatus according to another embodiment of this disclosure.

FIG. 7 is a schematic block diagram of a memory management apparatus 800 according to an embodiment of this disclosure. The apparatus 800 shown in FIG. 7 includes a memory 801, a processor 802, a communication interface 803, and a bus 804. The memory 801, the processor 802, and the communication interface 803 implement communication connection between each other through the bus 804.

The memory 801 may be a read only memory (ROM), a static storage device, a dynamic storage device, or a random access memory (RAM). The memory 801 may store a program. When the program stored in the memory 801 is executed by the processor 802, the processor 802 is configured to perform the operations of the memory management method in embodiments of this disclosure, for example, may perform the operations in embodiments shown in FIG. 2, FIG. 3, FIG. 4, and FIG. 5.

The processor 802 may be a general-purpose central processing unit (CPU), a microprocessor, an application-specific integrated circuit (ASIC), or one or more integrated circuits. The processor 802 is configured to execute a related program, to implement the memory management method in the method embodiments of this disclosure.

The processor 802 may be an integrated circuit chip and has a signal processing capability. During embodiments of implementation, operations of the memory management method in embodiments of this disclosure may be completed by using an integrated logic circuit of hardware in the processor 802 or instructions in a form of software.

The processor 802 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the operations, and logical block diagrams that are disclosed in embodiments of this disclosure. The general-purpose processor may be a microprocessor, or the processor may be any conventional processor or the like.

Operations of the methods disclosed with reference to embodiments of this disclosure may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 801. The processor 802 reads information in the memory 801, and completes, in combination with hardware of the processor 802, functions that need to be performed by units included in the memory management apparatus in embodiments of this disclosure, or performs the memory management method in the method embodiments of this disclosure. For example, the processor 802 may perform the operations/functions in embodiments shown in FIG. 2, FIG. 3, FIG. 4, and FIG. 5.

The communication interface 803 may use, but not limited to, a transceiver apparatus of a transceiver type, to implement communication between the apparatus 800 and another device or a communication network.

The bus 804 may include a channel on which information is transmitted between the components (for example, the memory 801, the processor 802, and the communication interface 803) of the apparatus 800.

It should be understood that the apparatus 800 shown in this embodiment of this disclosure may be a processor in a cloud server, or may be a chip in a cloud server, to perform the method described in embodiments of this disclosure.

It should be understood that, the processor in embodiments of this disclosure may be a central processing unit (CPU). The processor may be further another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in embodiments of this disclosure may be a volatile memory or a nonvolatile memory, or may include a volatile memory and a nonvolatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), used as an external cache. Through an example rather than a limitative description, random access memories (RAM) in many forms may be used, for example, a static RAM (SRAM), a dynamic random access memory (DRAM), a synchronous DRAM (SDRAM), a double data rate synchronous dynamic random access memory (double data rate SDRAM, DDR SDRAM), an enhanced SDRAM (ESDRAM), a synchlink dynamic random access memory (synchlink DRAM, SLDRAM), and a direct rambus RAM (DR RAM).

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects, and represents that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this disclosure, at least one means one or more, and a plurality of means two or more. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of embodiments of this disclosure.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding procedure in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this disclosure, but the protection scope of this disclosure is not limited thereto. Any variation or replacement that can be readily figured out by the person skilled in the art within the technical scope disclosed in this disclosure shall fall within the protection scope of this disclosure. Therefore, the protection scope of this disclosure shall be subject to the protection scope of the claims.

What is claimed is:

1. A memory management method, comprising:
    obtaining a read request or a write request of a first control group (cgroup), wherein the first cgroup is one of a plurality of cgroups, and the read request or the write request requests to read or write target data from or into a target cache page;
    in response to determining a read operation or a write operation based on the read request or the write request, updating a first record table of the target cache page to obtain an updated first record table by updating a quantity of times the target data is read or written by the first cgroup, wherein the read operation or the write operation is to read or write the target data from or into the target cache page, the first record table comprises a second cgroup and the quantity of times that the target data is read or written by the second cgroup, and the second cgroup is a cgroup in the plurality of cgroups that has read or written the target data from or into the target cache page, wherein the first record table further indicates an amount of data read or written by the second cgroup, and the updating the first record table of the target cache page based on the read operation or the write operation to obtain the updated first record table comprises:
        reallocating, based on a preset policy, the amount of the data read or written by the second cgroup, and
        updating the first record table based on the read request or the write request and a reallocated amount of the data read or written by the second cgroup, to obtain the updated first record table; and
    triggering performance of throttling on the first cgroup, based at least in part on detection that a value recorded in the updated first record table satisfies a limit value, the limit value comprising a quantity of times that the first cgroup reads or writes the target data.

2. The method according to claim 1, wherein the reallocating, based on the preset policy, the amount of the data read or written by the second cgroup comprises:
    reallocating, based on a quantity of cgroups in a union set of the first cgroup and the second cgroup, an amount of data read or written by each cgroup in the union set, wherein the union set is a combination of none or more elements of set A or none or more elements of set B or none or more elements of both set A and set B.

3. The method according to claim 1, wherein the reallocating, based on the preset policy, the amount of the data read or written by the second cgroup comprises:
    reallocating, based on a quantity of times of reading or writing of each cgroup in a union set of the first cgroup and the second cgroup in the updated first record table, an amount of data read or written by each cgroup in the union set.

4. The method according to claim 3, wherein the triggering performance of throttling on the first cgroup further comprises:
    indicating, based on an amount of data that is read or written by the first cgroup and that is recorded in the updated first record table, performance of throttling on the first cgroup.

5. The method according to claim 1, wherein after the obtaining the request that the first cgroup requests to read target data from the target cache page, the method further comprises:
    initializing the first record table when there is no target data on the target cache page; and
    reading the target data from a storage device to the target cache page.

6. The method according to claim 1, wherein after the obtaining the request that the first cgroup requests to write target data into the target cache page, the method further comprises:
    initializing the first record table when there is no target data on the target cache page; and
    writing the target data into the target cache page.

7. A memory management apparatus, comprising:
    a memory configured to store program instructions; and
    a processor, coupled with the memory, configured to invoke the program instructions to perform operations comprising:
        obtaining a read request or a write request of a first control group (cgroup), wherein the first cgroup is one of a plurality of cgroups, and the read request or the write request requests to read or write target data from or into a target cache page,
        in response to determining a read operation or a write operation based on the read request or the write request, updating a first record table of the target cache page to obtain an updated first record table by updating a quantity of times the target data is read or written by the first cgroup, wherein the read operation or the write operation is to read or write the target data from or into the target cache page, the first record table comprises a second cgroup and a quantity of times that the target data is read or written by the second cgroup, and the second cgroup is a cgroup in the plurality of cgroups that has read or written the target data from or into the target cache page, wherein the first record table further indicates an amount of data read or written by the second cgroup, and the updating the first record table of the target cache page based on the read operation or the write operation to obtain the updated first record table comprises:
            reallocating, based on a preset policy, the amount of the data read or written by the second cgroup, and
            updating the first record table based on the read request or the write request and a reallocated amount of the data read or written by the second cgroup, to obtain the updated first record table, and
        triggering performance of throttling on the first cgroup, based at least in part on detection that a value recorded in the updated first record table satisfies a limit value, the limit value comprising a quantity of times that the first cgroup reads or writes the target data.

8. The memory management apparatus according to claim 7, wherein the reallocating, based on the preset policy, the amount of the data read or written by the second cgroup comprises:
    reallocating, based on a quantity of cgroups in a union set of the first cgroup and the second cgroup, an amount of data read or written by each cgroup in the union set, wherein the union set is a combination of none or more elements of set A or none or more elements of set B or none or more elements of both set A and set B.

9. The memory management apparatus according to claim 7, wherein the reallocating, based on the preset policy, the amount of the data read or written by the second cgroup comprises:
reallocating, based on a quantity of times of reading or writing of each cgroup in a union set of the first cgroup and the second cgroup in the updated first record table, an amount of data read or written by each cgroup in the union set.

10. The memory management apparatus according to claim 9, wherein the triggering performance of throttling on the first cgroup further comprises:
indicating, based on an amount of data that is read or written by the first cgroup and that is recorded in the updated first record table, performance of throttling on the first cgroup.

11. The memory management apparatus according to claim 7, wherein after the obtaining the request that the first cgroup requests to read target data from the target cache page, the operations further comprise:
initializing the first record table when there is no target data on the target cache page; and
reading the target data from a storage device to the target cache page.

12. The memory management apparatus according to claim 7, wherein after the obtaining the request that the first cgroup requests to write target data into the target cache page, the operations further comprise:
initializing the first record table when there is no target data on the target cache page; and
writing the target data into the target cache page.

13. A non-transitory computer-readable storage medium, wherein the computer-readable storage medium stores program instructions, which when invoked by a processor, cause the processor to perform operations comprising:
obtaining a read request or a write request of a first control group (cgroup), wherein the first cgroup is one of a plurality of cgroups, and the read request or the write request requests to read or write target data from or into a target cache page;
in response to determining a read operation or a write operation based on the read request or the write request, updating a first record table of the target cache page to obtain an updated first record table, wherein the read operation or the write operation is to read or write the target data from or into the target cache page, the first record table comprises a second cgroup and a quantity of times that the target data is read or written by the second cgroup, and the second cgroup is a cgroup in the plurality of cgroups that has read or written the target data from or into the target cache page, wherein the first record table further indicates an amount of data read or written by the second cgroup, and the updating the first record table of the target cache page based on the read operation or the write operation to obtain the updated first record table comprises:
reallocating, based on a preset policy, the amount of the data read or written by the second cgroup, and
updating the first record table based on the read request or the write request and a reallocated amount of the data read or written by the second cgroup, to obtain the updated first record table; and
triggering performance of throttling on the first cgroup, based at least in part on detection that a value recorded in the updated first record table satisfies a limit value, the limit value comprising a quantity of times that the first cgroup reads or writes the target data.

14. The non-transitory computer-readable storage medium according to claim 13, wherein the reallocating, based on the preset policy, the amount of the data read or written by the second cgroup comprises:
reallocating, based on a quantity of cgroups in a union set of the first cgroup and the second cgroup, an amount of data read or written by each cgroup in the union set, wherein the union set is a combination of none or more elements of set A or none or more elements of set B or none or more elements of both set A and set B.

15. The non-transitory computer-readable storage medium according to claim 13, wherein the reallocating, based on the preset policy, the amount of the data read or written by the second cgroup comprises:
reallocating, based on a quantity of times of reading or writing of each cgroup in a union set of the first cgroup and the second cgroup in the updated first record table, an amount of data read or written by each cgroup in the union set.

16. The non-transitory computer-readable storage medium according to claim 15, wherein the triggering performance of throttling on the first cgroup further comprises:
indicating, based on an amount of data that is read or written by the first cgroup and that is recorded in the updated first record table, performance of throttling on the first cgroup.

17. The non-transitory computer-readable storage medium according to claim 13, wherein after the obtaining the request that the first cgroup requests to read target data from the target cache page, the operations further comprise:
initializing the first record table when there is no target data on the target cache page; and
reading the target data from a storage device to the target cache page.

* * * * *